W. MATTHEISS.
MANUFACTURE OF COMPOUND LARD.
APPLICATION FILED SEPT. 27, 1909.
980,809.
Patented Jan. 3, 1911.
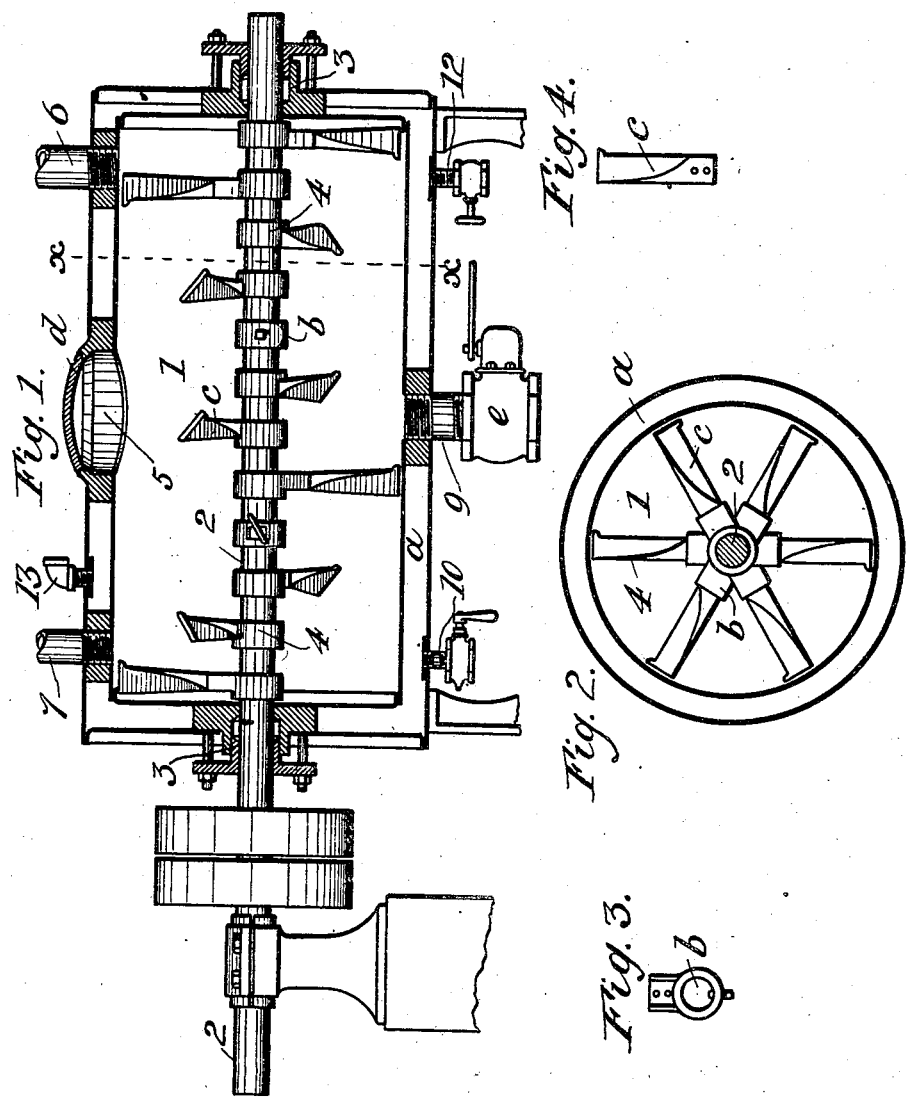
Witnesses
Alberta Richards
Paul Chinggold
Inventor
William Mattheiss,
by G.H. & W.T. Howard,
Attorneys.

UNITED STATES PATENT OFFICE.

WILLIAM MATTHEISS, OF BALTIMORE, MARYLAND.

MANUFACTURE OF COMPOUND LARD.

980,809.   Specification of Letters Patent.   Patented Jan. 3, 1911.

Application filed September 27, 1909. Serial No. 519,734.

*To all whom it may concern:*

Be it known that I, WILLIAM MATTHEISS, of the city of Baltimore and State of Maryland, have invented certain Improvements in the Manufacture of Compound Lard, of which the following is a specification.

This invention relates to the manufacture of what is known to the trade, as compound lard, that is to say,—an article which is composed of cotton seed oil, and the solid fat as expressed from ordinary fat and properly known as stearin; and it consists in a peculiar process of treating the said materials, as will hereinafter fully appear.

Many efforts have been made to combine cotton seed oil and stearin with the view to produce a body of uniform consistency, but to the best of my knowledge such a result has not been attained prior to my present invention.

The difficulty met with is the tendency of such dissimilar materials as cotton seed oil and stearin, after being heated, to separate upon cooling, and in such case, the product consists of a loose mechanical mixture of the two ingredients in practically the same condition as they were before the mixing operation, except that the stearin is reduced to small particles which are held in suspension in the oil. This granular condition of the finished product will be produced by sudden refrigeration of the heated compound, but a similar result is found if the compound is allowed to stand undisturbed during a gradual and natural cooling.

By experiment I have found that when one hundred pounds of cotton seed oil is added to fifteen or twenty pounds of stearin and the mixture heated to the boiling point of water, then stirred for a reasonable time at the same temperature, then gradually reduced in temperature while still being stirred, to between eighty and ninety degrees Fahrenheit, the finished product will resemble pure lard in texture, no granulation being apparent, and this desirable condition is maintained indefinitely.

In the further description of the said invention which follows, reference is made to the accompanying drawing, which illustrates the apparatus which I prefer to use in carrying out my improved process.

Figure 1 is a partly sectional side view of the improved apparatus. Fig. 2 is a section of Fig. 1 taken on the dotted line *x—x*. Figs. 3 and 4 are detailed views of parts of certain paddles employed in the apparatus.

Referring now to the drawing, 1 is a stationary cylinder having a double wall whereby the space *a* is formed for a purpose hereinafter described.

2 is a central rotary shaft which passes through and is supported by the packing boxes 3 in the heads of the cylinder. To the shaft 2 are secured the paddles 4 which may be of any appropriate construction. They are preferably made in two parts, viz., a hub *b* which is directly secured to the shaft, and a blade *c* the inner end of which is inserted and fastened in a depression in the hub.

5 is a man-hole covered by the plate *d*, and 6 a feed pipe through which the combined oil and stearin in substantially the proportions above stated, and in a heated condition, is poured. A vent pipe 7 which like the feed pipe 6 is in communication with the interior of the cylinder, serves to allow of the escape of vapor which from any cause may be present in the cylinder.

9 is the delivery pipe for the compound lard after the completion of the process of its manufacture. It is provided with an ordinary gate or globe valve *e*.

10 is a pipe whereby water under pressure can be introduced into the space *a*; and 12 a similar pipe for the supply of steam to the same space.

13 is an over-flow pipe for the water supplied through the pipe 10.

Supposing the shaft 2 with its paddles 4 to be in rapid rotation, the operation of the apparatus is as follows:—The combined oil and stearin which has been previously heated to the temperature of boiling water is poured into the cylinder through the feed pipe 6. Steam is then admitted to the space *a*, and after the material is thoroughly mixed, cold water is turned on which becomes heated by the action thereon of the steam, and after the water has reached a temperature approaching the boiling point, the steam is gradually shut off so that the temperature of the compound lard is gradually reduced to a point between 80 and 90 degrees Fahrenheit, when it is drawn off, and allowed to stand undisturbed until its temperature reaches that of the air. The product is now in marketable condition, the union of its two constituents being such that no granulation is observable, and is placed in suitable receptacles.

I claim as my invention,—

The process of producing compound lard from cotton seed oil and stearin, which consists in adding to one hundred pounds of cotton seed oil, fifteen to twenty pounds of stearin and heating the two materials together, to the temperature of boiling water, then stirring them until thoroughly mixed, then while the stirring operation is continued, gradually reducing the temperature of the combined materials to a temperature of about 80 or 90 degrees Fahrenheit, and then allowing the material to stand undisturbed until it reaches the temperature of the air.

WILLIAM MATTHEISS.

Witnesses:
 THOMAS G. HULL,
 WM. T. HOWARD.